UNITED STATES PATENT OFFICE.

KARL SCHWICKERATH, OF BONN, GERMANY.

PROCESS OF TREATING FISH-FLESH.

954,050.  Specification of Letters Patent.  Patented Apr. 5, 1910.

No Drawing.   Application filed December 16, 1907. Serial No. 406,729.

*To all whom it may concern:*

Be it known that I, KARL SCHWICKERATH, a subject of the German Emperor, and resident of Bonn, Germany, have invented certain new and useful Improvements in Processes of Treating Fish-Flesh, of which the following is a specification.

In my prior patent, Number 860,814, dated July 16, 1907, I have described a process of freeing from fishy taste and smell, by means of permanganate salts, a proteose solution prepared from fish albumen. Such process differs from the present process in that the destruction and removal of the bad-smelling compounds are effected primarily by the addition of hydrated lime or other solution of an alkaline earth to the proteose solution.

In the present process, the fish flesh is treated, as in the earlier process, with superheated steam, to obtain the proteose solution. To this solution the hydrated lime, in the form of lime water, or dilute milk of lime, is added, whereupon the solution becomes cloudy. Upon the application of heat thereto a flocculent precipitate separates out, which precipitate may be readily filtered off, the residue on the filter possessing an offensive fishy smell. The clear filtrate is then evaporated and dried. The addition of the hydrated lime, to the proteose solution may be continued until it is determined from examination of a sample of the filtrate that the further addition of the lime and subsequent heating will cause no further precipitation.

The following may be given as an example of the process:—50 kilograms of fish flesh are treated in an autoclave with superheated steam at a temperature of from 120° to 130° centigrade, for a period of about two hours. The liquid portion of the contents is then separated off from the solid matter. To the liquid thus obtained are added 150 grams of calcium hydroxid in the form of milk of lime. The mass is then heated to about 70° to 80° centigrade, or until a flocculent precipitate separates out. The liquid is then filtered, and the clear filtrate then evaporated and dried.

I claim as my invention:—

1. A process of removing the fishy taste and smell from a proteose solution prepared from fish flesh, consisting in adding to such solution a solution of an alkaline earth, heating the resultant solution, filtering said resultant solution, and evaporating and drying the clear filtrate.

2. A process of making a proteose preparation from fish which consists in treating fish flesh with superheated steam to obtain a proteose solution, treating such solution with milk of lime, heating the resultant solution until a flocculent precipitate separates out, filtering the liquid, and evaporating and drying the clear filtrate.

In testimony whereof I have hereunto set my hand in the presence of two subscribing witnesses.

KARL SCHWICKERATH.

Witnesses:
 PAUL HUNGER,
 GUSTAV VOSSEN.